United States Patent [19]

Fessler et al.

[11] 4,334,838
[45] Jun. 15, 1982

[54] DIAPHRAGM TYPE FLUID PUMP HAVING A FLEXIBLE DIAPHRAGM WITH AN INTERNAL REINFORCING PLATE

[75] Inventors: Herman S. Fessler, Coon Rapids, Minn.; William S. Credle, Jr.; William A. Harvill, both of Stone Mountain, Ga.

[73] Assignees: The Coca-Cola Company, Atlanta, Ga.; The Cornelius Company, Anoka, Minn.

[21] Appl. No.: 116,505

[22] Filed: Jan. 29, 1980

[51] Int. Cl.³ .............................................. F04B 43/06
[52] U.S. Cl. ........................................ 417/395; 92/99; 92/103 F
[58] Field of Search ............... 92/99, 103 F, 98 R; 417/395

[56] References Cited

U.S. PATENT DOCUMENTS

| | | | |
|---|---|---|---|
| 2,690,859 | 10/1954 | Snyder | 417/395 X |
| 2,711,134 | 6/1955 | Hughes | 417/395 |
| 2,741,187 | 4/1956 | Moller | 92/99 X |
| 3,000,320 | 9/1961 | Ring | 417/395 X |
| 3,386,345 | 6/1968 | Taplin | 92/99 |
| 4,086,036 | 4/1978 | Hagen et al. | 92/99 X |
| 4,162,549 | 7/1979 | Charles et al. | 417/395 X |
| 4,231,721 | 11/1980 | Hawk et al. | 417/413 |

FOREIGN PATENT DOCUMENTS 2649989 5/1978 Fed. Rep. of Germany .......... 92/99

Primary Examiner—Leonard E. Smith
Attorney, Agent, or Firm—Henry C. Kovar

[57] ABSTRACT

A pneumatically powerable single action fluid pump has a housing, an improved diaphragm assembly dividing the housing into fluidly discrete propellant and pumping chambers, a fluid inlet and outlet in the pumping chamber, a fluid port to the propellant chamber and a spring motor biasing the diaphragm assembly in a direction away from the pumping chamber side of the housing; the diaphragm assembly includes a perforate rigid diaphragm plate, an elongate motor stem connected to the plate, a contiguous elastomeric diaphragm having an imperforate front layer covering a front side of the plate and stem, a rear layer on a rear side of the plate, pins in the plate perforations and between and adjoining the diaphragm layers, and a bellows section to the outside of the plate. The spring motor biases the diaphragm to a position in close proximity to the fluid port of the propellant chamber in the absence of propellant therein against a plurality of spacer ribs. The spacer ribs permit an even and rapid distribution of propellant into the propellant chamber to drive the diaphragm assembly against the biasing action of the spring motor toward the pumping chamber.

5 Claims, 5 Drawing Figures

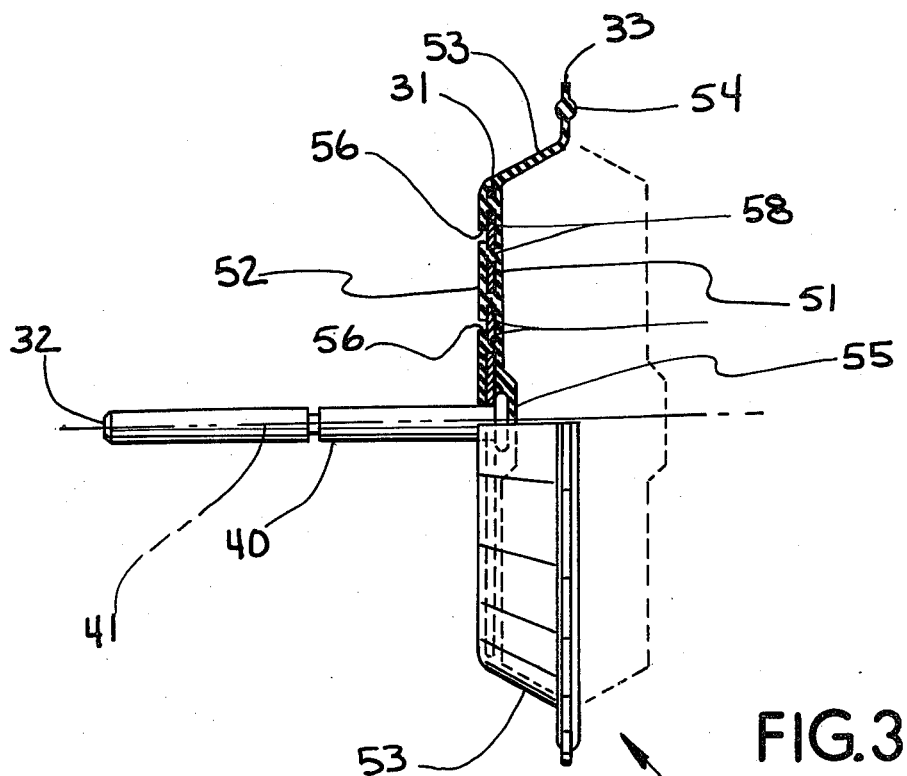
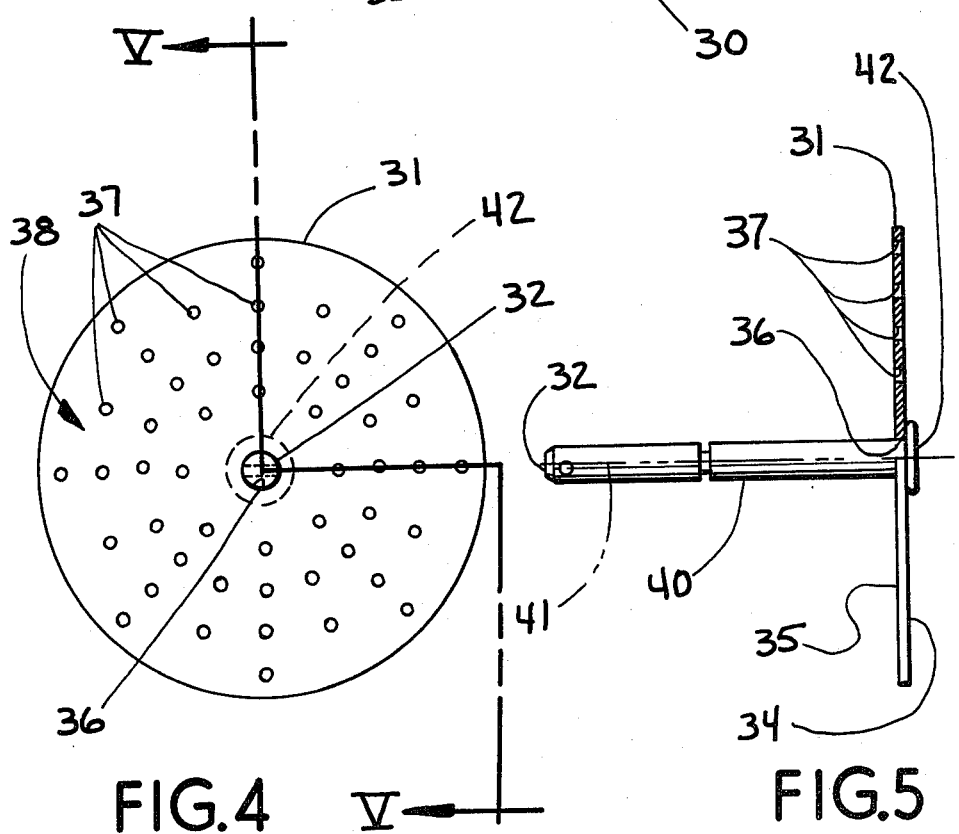

DIAPHRAGM TYPE FLUID PUMP HAVING A FLEXIBLE DIAPHRAGM WITH AN INTERNAL REINFORCING PLATE

BACKGROUND OF THE INVENTION

1. Field of the Invention

This invention pertains to a fast acting, expansible chamber fluid pump and a diaphragm assembly therefor.

2. Description of the Prior Art

Prior art diaphragms, or bellows are exemplified by a thin sheet of elastomeric resilient material which is intended to be fixedly grasped about its periphery, and which has a central aperture through which extends a motor shaft. Rigid reinforcing plates are secured to one or both sides of an elastomeric sheet and these plates are usually compressed to the sheet by fastener nuts on the motor shaft.

These prior diaphragms and reinforcing plates have presented the metal reinforcing plates in contact with the fluid being pumped. The result is trace quantities of metal in fluids being pumped.

The plate and fastener on the pumped fluid side of the diaphragm also present a crevice around their periphery. This crevice effects carry-over of fluid, trapping of fluid, contamination during periods of non-usage, and presents a cleaning and sanitation problem.

Mechanical fasteners used for retention of the plates to the motor stem usually require a chemical adhesive for reliability, but they still tend to come apart as well as presenting metal to pumped fluid and providing more crevices.

These problems are particularly acute when food products are being pumped. Specific examples of these food products include soft drink syrups, milk, juice concentrates, chocolate and the like. Minute traces of metal effect an off-taste characterized as being metallic, and effect spoilage of the food product. Carry-over of caustic sanitizers effects off-tastes in the food products.

Prior art expansible chamber fluid pumps also do not have sufficiently fast response times to the introduction of propellant fluid. These slow response times are obviously undesirable for dispensing equipment used in fast food establishments.

OBJECTS OF THE INVENTION

It is an object of the present invention to provide an improved diaphragm assembly for a diaphragm type fluid pump.

It is an object of the present invention to provide a fluid pump diaphragm assembly having a rigid plate and a motor stem and in which neither the plate nor the stem is exposed to fluid being pumped.

It is an object of the present invention to provide a fluid pump diaphragm assembly in which an imperforate diaphragm retains a motor stem in a rigid diaphragm plate.

It is an object of the present invention to provide an improved single action fluid pump having an improved diaphragm which does not present metal to the fluid being pumped.

It is an object of the present invention to provide a single action-fluid pump with an improved response time to propellant fluid.

SUMMARY OF THE INVENTION

In accordance with the principles of the present invention, a diaphragm assembly for a diaphragm type fluid pump has a rigid plate with a front side and a rear side, a motor stem connected to the plate and extending away from the rear side of the plate, and an elastomeric diaphragm molded to the plate and the stem. The diaphragm has an imperforate layer on the front side of the plate which covers the plate and stem from exposure to pumped fluid. At the beginning of a pumping stroke the rear side of the diaphragm is disposed closely adjacent a wall of the pump housing containing a liquid propellant inlet. Spacer ribs on that wall evenly and rapidly distribute incoming propellant against the rear side of the diaphragm to drive the same.

BRIEF DESCRIPTION OF THE DRAWINGS

FIG. 3 is a side elevational view on partial section as taken through lines III—III of FIG. 2;

FIG. 4 is an end elevational view of the plate and stem of the diaphragm assembly of FIG. 2; and FIG. 5 is a side elevational view in partial section, as taken through lines V—V of FIG. 4.

DESCRIPTION OF THE PREFERRED EMBODIMENT

Figure 1:
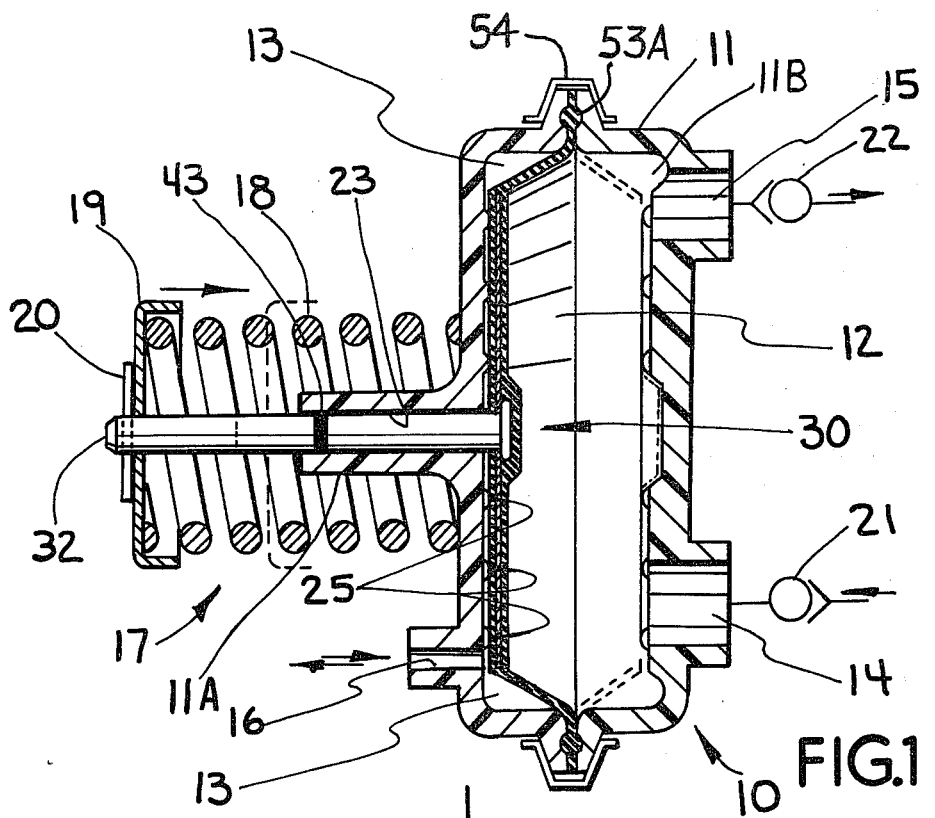
FIG. 1 is an elevational cross-sectional view of the preferred embodiment of a fluid pump in accordance with the principles of the present invention.
Figure 2:
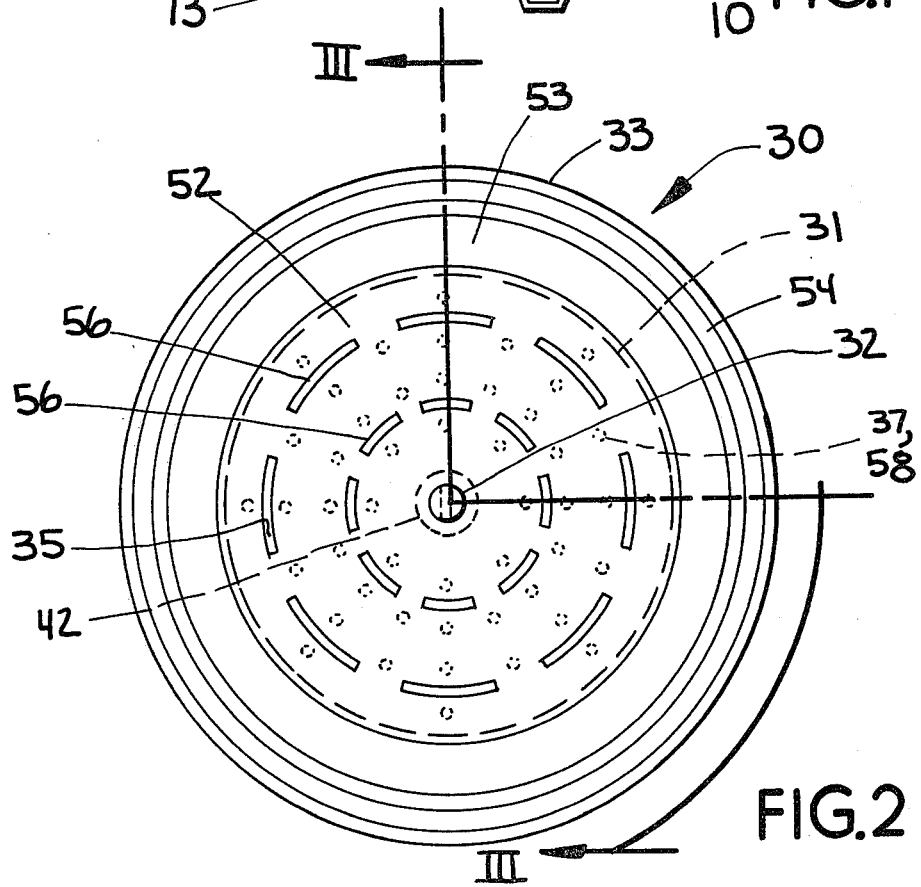
FIG. 2 is an end elevational view of the preferred embodiment of a diaphragm assembly in accordance with the principles of the present invention and as shown in the pump of FIG. 1.

The principles of the present invention are particularly useful when embodied in the fluid pump generally indicated by the number 10, and in the diaphragm assembly generally indicated by the numeral 30.

The pump 10 is a pneumatically powerable single action device having a two-piece housing 11, coupled together by a V-clamp 54, and a diaphragm assembly 30 which divides the interior of the housing 11 into a pumping chamber 12 and a propellant chamber 13. The pumping chamber 12 has a fluid inlet 14 with an incoming check valve 21 and a fluid outlet 15 with an outgoing check valve 22.

Fluid outlet 15 is disposed at the highest possible point in housing 11, as viewed in FIG. 1, to preclude the entrapment of air in chamber 12 above outlet 15. With such a location of outlet 15 pump 10 will operate in either the horizontal position of FIG. 1, or a vertical position without entrapping and pumping air from chamber 12. Housing 11 also has a circumferential groove 11B adjacent inlet 14 and 15 to preclude any possibility of diaphragm assembly 30 from sealing off said inlet or outlet. The propellant chamber 13 has a fluid port 16 through which pressurized propellant fluid, for example compressed carbon dioxide gas, may be admitted or released.

The diaphragm assembly 30 includes a reinforcing plate 31, a motor stem 32 and the diaphragm 33. The plate 31 is substantially planar or flat, is relatively rigid under the forces it is subjected to, and is preferably made of metal. The plate 31 has a front side 34 facing towards the pumping chamber 12, and a rear side 35 facing towards the propellant chamber 13. A central aperture 36 is in the middle of the plate 31, and perforations 37 in the form of round holes through the plate 31 are in a pattern 38 around and generally concentric to the aperture 36.

The motor stem 32 is an elongate member, preferably of metal, and is mounted to the plate 31. An elongate body 40 of the stem 32 is passed through the plate aperture 36 and a diametrically enlarged head 42 abuttingly engages against the plate front side 34. The elongate stem axis 41 is substantially perpendicular to the plane of the plate 31. The stem 32 projects from the plate rear side 35, through the propellant chamber 13, and through a bore 23 defined by a stem guide 11A in the rear side of the housing 11. The stem 32 is reciprocable in the stem guide bore 23 and a seal 43 fluid tightly seals the stem 42 to the housing bore 23.

It is advantageous to place seal 43 on stem 32 rather than in the stem guide 11A because it is easier to repair and assemble. Seal 43 may be replaced merely by removing stem 32 and the diaphragm assembly 30 from the pump with the construction of the present invention. In addition, if seal 43 were placed within the stem guide 11A a retaining clip would be needed to hold it in place. Stem guide 11A and housing 11 are fabricated from a thermoplastic polyester of low friction material to permit the reicprocation of stem 32 and seal 43 therein. An example of a suitable material is, Valox T.M., manufactured by the General Electric Company.

A spring motor 17 biases the motor stem 32, plate 31, and most of the diaphragm 33 towards the rear of the housing 11 and towards the propellant chamber 13. The spring motor 17 has a spring 18 compressed between the housing 11 and a spring retainer 19 held on and to the motor stem 32 by a keeper 20 in the stem. Retainer 19 in conjunction with spring 18 has a self-centering action on stem 32. That is, it tends to direct stem 32 along the central axis of bore 23 in stem guide 11A.

An important feature of the pump 10 and the diaphragm assembly 30 is the diaphragm per se 33 and its construction with respect to the plate 31 and stem 32. The diaphragm 33 is continuous, specifically it is of integral one-piece construction and has a front layer 51 on the plate front side 34, a rear layer 52 on the plate rear side 35 and a resiliently flexible annular bellows 53 around and to the outside of the plate 31 and the front and rear layers 51, 52. To the outside of the bellows section 53 is an annular V-clamp ring 54 which clamps a bead 53A of bellows section 53 in a fluid tight manner between the two respective pieces of the housing. The front layer 51 is imperforate and generally monolithic and completely covers the plate 31 and stem 32 from the pumping chamber 12. The front layer 51 has a convex section 55 projecting into the pumping chamber 12 and imperforately covering the stem enlarged head 42. The covered stem 32 may be welded to the plate 31 and this type of construction is particularly useful if the diaphragm assembly 30 is to be driven by a mechanical or electrical device such as a cam, lever or solenoid (not shown) operatively engaging the motor stem 32 and pushing it inwardly. In the illustrated pneumatically powerable mode, the stem 32 need not be welded to plate 31. The diaphragm 33 and in particular the center and convex section 55 thereof, mechanically retains the stem enlarged head 42 abutted against the plate front side 34. The rear layer 52 is abutted against and secured to the stem 40 immediately adjacent the plate aperture 36. Enlarged head 42 is both mechanically abraded and adhesively secured to diaphragm convex section 55 thus forming a fluid tight seal. This precludes propellant gas from bleeding through diaphragm 33 in the region of head 42 and convex section 55.

The diaphragm 33 is also both mechanically and adhesively secured to the plate 31 and stem 32. The plate 31 is mechanically abraded on both of the front and rear sides 34, 35 and covered with a thin layer of adhesive (not shown). The elastomeric diaphragm 33 is molded in-situ about the stem 32 and plate 31 and integral elastomeric pins 58 are molded through the plate perforations 37. These pins 58 are integral with both the front layer 51 and the rear layer 52 and mechanically retain the layers 51, 52 against the plate 31.

The rear layer 52 has a plurality of perforations 56 which open the propellant chamber. These rear layer perforations 56 enable mechanical support of the plate 31 during molding of the diaphragm 33. The plate perforations 37 and the diaphragm pins 58 therein are laterally spaced from any of the rear layer perforations 56 so that every diaphragm pin 58 is adjoined to both the front and rear layers 51, 52 and neither of the diaphragm layers can be pulled from the plate 31 without putting all adjacent pins 58 under tensile stress.

The diaphragm layers 51, 52 and plate 31 are intended to be substantially perpendicular to the motor stem 32, and are held off but closely spaced from the housing 11 by concentric C-shaped arcuate ribs 25 standing off the inside of the housing 11 in the propellant chamber and between the housing 11 and the plate rear side 35. The ribs 25 support the plate 31 and diaphragm layers 51, 52 in a position perpendicular to the stem 32 in the position illustrated in FIG. 1. The propellant fluid port 16 is radially within the opening between ends of the C-shaped ribs 25. Thus, fluid pressure is rapidly and evenly distributed within all of the ribs 25 against the rear layer 52 of diaphragm 33 so that the plate 31 and diaphragm layers 51, 52 remain perpendicular to the motor stem 32 as they leave or return to the ribs 25.

As illustrated in FIG. 1, the space behind diaphragm 33 at the beginning of a pumping stroke is kept to a minimum, namely it is defined by the height of ribs 25. This small space provides definite advantages. For example, it increases the response time of the pump to incoming propellant pressure and it maximizes the volume of fluid pumped per stroke for a housing of a given size. Furthermore, as stated above, the ribs 25 evenly distribute the propellant behind diaphragm 33 further increasing the response time of the pump to the driving force of the propellant.

In the operation and use of the pump 10 and the diaphragm assembly 30 therefor, the diaphragm assembly 30 has been fabricated as an assembly of the plate 31, stem 32 and diaphragm 33 and it is one component, and cannot be broken down or taken apart. The diaphragm assembly 30 is placed in the housing 11, the spring motor 17 is operatively connected, and the diaphragm V-clamp ring 54 secures the two pieces of housing 11 together in a fluid tight manner.

The pump fluid inlet 14 is fluidly connected to a source of fluid intended to be pumped, the pump fluid outlet 15 is connected to a destination to which fluid from the source is to be pumped, and the propellant fluid port 16 is connected to a source of pressurized propellant fluid, preferably but not necessarily a gas, under the control of suitable valving for intermittent application and relief of propellant pressure.

When the pump 10 is on standby and awaiting use, the diaphragm assembly 30 is in the position and configuration shown best in FIG. 1. The spring motor 17 exerts a constant bias on the diaphgram assembly 30 and keeps the diaphragm layers 51, 52 and plate 31 against the ribs 25 and perpendicular to the stem 32. As stated hereinbefore, this minimizes the volume of the propellant chamber 13 and maximizes the volume of the pumping chamber 12. The stem enlarged head 42 is positively abutted against the plate 31 and cannot come apart. There is no metal exposed to fluid in the pumping chamber 12.

Propellant pressure is selectively applied through the port 16 and is evenly and rapidly distributed in the propellant chamber 13 by ribs 25 behind diaphragm 33. As the propellant chamber 13 expands under propellant pressure, the pumping chamber 12 is reduced in volume and the inlet check valve 21 closes and the outlet check valve 22 opens and fluid is pumped out of the outlet 15. The propellant pressure is applied equally on the diaphragm rear layer 52 and bellows 53. Under this pressure the rear diaphragm layer 52 retains the diaphragm bellows 53 and the plate 31. The propellant force is taken by the plate 31, transferred through the head 42 to the stem 32 which is then drawn into the housing 11 as the spring motor 17 is compressed during pumping.

When the propellant pressure is relieved, the spring motor 17 begins to pull the diaphragm assembly 30 back. The outlet check valve 22 closes and the inlet check valve 21 opens and new fluid is drawn from the source and into the pump chamber 12. This new fluid is drawn by suction and the diaphragm 33 and plate 31 will be negatively pressurized. The spring motor 17 pushes the motor stem 32 outward, the stem head 42 pulls the plate 31, and the plate pulls the diaphragm front layer 51 and pushes the diaphragm rear layer 52. The front and rear layers 51, 52 both pull the bellows 53. The front layer 51 cannot separate from the plate 31 under vacuum because of the bonding and the pins 58 which tie the front and rear layers 51, 52 together and to the plate 31.

The pump 10 and diaphragm assembly 30 offer substantial advantages in the handling of food fluids or corrosives. There is no metal to fluid contact, no possibility of failure between the plate 31 and the stem 32, and the diaphragm 33 is virtually inseparable from the plate 31 and stem 32. There are no crevices for contamination and cleanability is enhanced. The problem of the diaphragm bellows being blown over the front side of the rigid plate has been solved without the necessity for a rigid block or other device on the front side of the diaphragm. The pump 10 is able to be pressurized at 50 PSIG without the erratic collapse of diaphragm and short delivery of pumped fluid. A very high strength spring motor may be used with this improved diaphragm and pump and the suction capabilities are sufficient for lifting beverage syrup concentrates at least twenty feet, (6.1 meters).

These advantages, usages and many other usages will be found and realized by those versed in the art, and although various minor modifications may be suggested and employed by those who are versed in the art, be in known that I wish to embody within the scope of the patent granted hereon all such embodiments as reasonably come within the scope of my contribution to the art.

We claim as our invention:

1. A diaphragm assembly for a diaphragm type fluid pump, comprising:

a substantially planar and rigid diaphragm plate having a front and rear side, a central aperture therethrough, and a pattern of perforations around and generally concentric to the central aperture;

an integral one-piece elongate and rigid motor stem mounted in and through the plate aperture, said stem having an elongate body extending from the plate rear side;

a diametrically enlarged head on the stem, said head being of a larger diameter than the elongate body and being abutted against and protruding forward of the plate front side;

a relatively flexible elastomeric diaphragm molded to the plate and stem, said diaphragm having an imperforate layer covering the entirety of the plate front side and the stem head; and in which the diaphragm has (a) an imperforate monolithic front layer secured to the plate, and covering the entirety of the plate front side and the stem head;
(b) integral pins extending from the front layer and through the plate perforations;
(c) a rear layer integrally connected to the front layer by and through the pins; and
(d) perforations through the rear layer, the plate perforations and the diaphragm pins therein being spaced from any of the diaphragm rear layer perforations.

2. A diaphragm assembly for a diaphragm type fluid pump, comprising:

a substantially planar rigid diaphragm plate having a front and rear side;

an elongate rigid motor stem fitted loosely in a central aperture of the diaphragm plate;

a relatively flexible elastomeric diaphragm permanently secured to the plate and stem by being molded in mechanical engagement therewith, said stem being permanently fixed in the plate by the elastomeric diaphragm;

in which the plate has a pattern of perforations around and generally concentric to the stem; and in which the diaphragm has (a) a monolithic front layer secured to the plate;
(b) integral pins extending from the front layer and through the plate perforations;
(c) a rear layer integrally connected to the front layer by and through the pins; and
(d) perforations through the rear layer, the plate perforations and the diaphragm pins therein being spaced from any of the diaphragm rear layer perforations.

3. A diaphragm assembly for a diaphragm type fluid pump, comprising:

(a) a substantially planar and rigid diaphragm plate having a front and rear side, and a pattern of perforations around and generally concentric to a center of the plate;
(b) an elongate rigid motor stem mounted to the center of the plate;
(c) a relatively flexible elastomeric diaphragm molded to the plate, said diaphragm having:
    (1) an imperforate monolithic layer covering the entirety of the plate front side,
    (2) integral pins extending from the front layer and through the plate perforations,
    (3) a rear layer integrally connected to the front layer by and through the pins, and
    (4) perforations through the rear layer, the plate perforations and the diaphragm pins therein being transversely spaced from any of the diaphragm rear layer perforations.

4. A diaphragm assembly according to either of claims 1, 2 or 3, in which the plate front and rear surfaces are both mechanically abraded, said assembly including structural adhesive on both of the abraded front and rear surfaces, and in the plate perforations.

5. In a pneumatically powerable single action fluid pump having a housing, a diaphragm dividing the interior of the housing into fluidly discrete pumping and propellant chambers, means in fluid communication with the pumping chamber for admitting and discharging fluid to and from the pumping chamber, and means in fluid communication with the propellant chamber for admittance and exhaust of pneumatic propellant gas to and from the propellant chamber, the improvement comprising: a diaphragm assembly having (a) a substantially planar and rigid diaphragm plate having a front and rear side, and a pattern of perforations around and generally concentric to a center of the plate;
(b) an elongate and rigid motor stem mounted to the center of the plate;
(c) a relatively flexible elastomeric diaphragm molded to the plate, said diaphragm having:
  (1) an imperforate monolithic layer covering the entirety of the plate front side,
  (2) integral pins extending from the front layer and through the plate perforations,
  (3) a rear layer integrally connected to the front layer by and through the pins, and
  (4) perforations through the rear layer, the plate perforations and the diaphragm pins therein being transversely spaced from any of the diaphragm rear layer perforations.

* * * * *